United States Patent [19]
Withop et al.

[11] 4,093,688
[45] June 6, 1978

[54] METHOD OF MAKING MANGANESE-ZINC FERRITE

[75] Inventors: Arthur Withop; Roger Emil Travagli, both of San Jose, Calif.

[73] Assignee: Memorex Corporation, Santa Clara, Calif.

[21] Appl. No.: 607,211

[22] Filed: Aug. 25, 1975

[51] Int. Cl.$^2$ ............................................. F27B 9/04
[52] U.S. Cl. ................................. 264/65; 252/62.62; 264/66; 264/DIG. 58
[58] Field of Search .................... 252/62.56, 62.62; 264/61, 65, 125, 66, DIG. 58

[56] References Cited

U.S. PATENT DOCUMENTS

| | | | |
|---|---|---|---|
| 2,886,529 | 5/1959 | Guillaud | 264/65 |
| 3,027,327 | 3/1962 | Blank | 264/61 |
| 3,066,103 | 11/1962 | Owen | 252/62.56 |
| 3,252,913 | 5/1966 | Van Gils | 252/62.56 |

OTHER PUBLICATIONS

Shichyo et al, "Vacuum Sintered Mn–Zn Ferrites and Their Properties", *Proc. Int. Conf. on Ferrites*, Jul. 1970.

*Primary Examiner*—Robert F. White
*Assistant Examiner*—John Parrish
*Attorney, Agent, or Firm*—Limbach, Limbach & Sutton

[57] ABSTRACT

A multiple-stage sintering process is described for making low porosity manganese-zinc ferrites having good magnetic characteristics.

3 Claims, No Drawings

METHOD OF MAKING MANGANESE-ZINC FERRITE

BACKGROUND OF THE INVENTION

Magnetic read-write head materials in advanced disc drive systems must operate at recording frequencies exceeding 3MHz and must have core widths less than 0.004 inches to assure higher recording densities. The only presently available materials which meet these as well as head fabrication requirements, are magnetic ceramic oxides, specifically nickel-zinc and manganese-zinc ferrites.

Some physical properties of interest in processing of magnetic ceramic materials are porosity and microstructural grain size. Low porosity (high percent of theoretical density) is an important core parameter. When ferrite is glass bonded to form either gaps or core bonding to air-bearing slider, excessive ferrite porosity causes bubble formation in the glass. Subsequent lapping produces pits where glass bubbles were originally located; and since the ferrite is then locally unsupported, this leads to chippage. Ferrite porosity causes loss of dimensional control in gap and apex regions as well as wear problems on air-bearing surfaces. Intragranular porosity also acts as demagnetization sites thereby reducing permeability. However, small intergranular porosity is of no consequence.

Microstructural grain size affects several processing parameters. Lapping and polishing rates vary with changes in grain size, so it is desirable to maintain size control to assure material removal rate constancy. Grain size is inversely related to mechanical strength but directly related to permeability.

Nickel-zinc ferrites are limited by their stress sensitivity and their low read signal with thin core widths. With chromium dioxide disc media, pole tip saturation occurs prior to media saturation.

Manganese-zinc ferrite has the highest permeability and saturation induction of the ferrite class of materials and has the advantage of various stoichiometries with nearly zero magneto-crystalline anisotropy and magnetostriction, important for stress insensitivity and low noise. But not until recently has this material been commercially available with the low porosity required for head fabrication operations. Moreover, material processing of manganese-zinc ferrite to achieve low porosity requires pressure-sintering technology. See, for example, U.S. Pat. No. 3,557,266. Pressure-sintering necessitates the use of expensive capital equipment, controls and dies and is a production-limited process when compared with conventional nickel-zinc ferrite processing.

A vacuum-sintering technique which showed that low porosity and high permeability manganese-zinc ferrite at very low frequencies (<0.1 MHz) could be achieved with vacuums of 0.1 to 1.0$\mu$ followed by a stoichiometric furnace atmosphere soak and then a 1$\mu$ vacuum cooldown, was published by Shichijo and Takama, in an article entitled "Vacuum-Sintered Mn-Zn Ferrites and Their Properties" in *Proceeding of the International Conference on Ferrites*, July 1970.

Sintering of manganese-zinc ferrite is complicated by an additional process variable not common to nickel-zinc ferrite sintering, that of furnace atmosphere. In 1955 it was found that manganese ferrite sintered in carbon dioxide had improved magnetic properties over similar ferrites sintered in air. See G. Economos, J.A.C.S., 38, 292 (August 1955). X-ray diffraction analysis of stoichiometric manganese ferrite formulation, in air and nitrogen, has shown the following reactions to occur:

Air Sinter

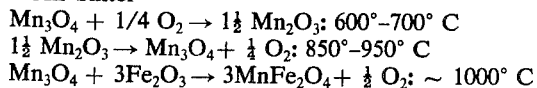

$Mn_3O_4 + 3Fe_2O_3 \rightarrow 3MnFe_2O_4 + \frac{1}{2} O_2: \sim 1000° C$

Nitrogen Sinter $Mn_3O_4 + Fe_2O_3 \rightarrow 3MnFe_2O_4 + \frac{1}{2} O_2: \sim 850° C$ Thus a reducing environment favors manganese-zinc ferrite formation. Moreover, it was also observed that slow cooling in nitrogen rather than air increased induction, i.e. decomposition of mangagese ferrite and subsequent reoxidation, was inhibited.

Manganese-zinc ferrite with a slight excess of $Fe^{+2}$ cations are known to produce the highest permeabilities. Excess oxygen partial pressures in the sinter atmosphere will favor $Fe^{+3}$ formation while an oxygen deficiency will maintain excess iron cations as $Fe^{+2}$. Upon cooling, a thermodynamic tendency exists for $Fe^{+2} \rightarrow Fe^{+3}$ so a lower oxygen partial pressure during cool down is required to maintain the $Fe^{+2}/Fe^{+3}$ ratio achieved during sintering.

However, while sintering atmosphere control assures a high magnetic induction and permeability, it does not necessarily yield a low porosity body. Sintering is a diffusion process which achieves final densification, homogeneous composition, and develops the microstructure. Since diffusion is a thermally activated process, one would expect lower porosities with increasing sinter temperatures. Indeed this occurs in most systems as long as the system is constant, i.e. no loss of a specie nor any phase changes.

Retrograde density with increasing sinter temperature was observed in the $BaO-TiO_2-SiO_2$ system due to a phase change. Zinc volatization during ferrite sintering has been reported and limits the upper sinter temperature, oxygen, atmosphere, and vacuum pressure. It has also been shown that at constant sinter temperatures, the lower the oxygen partial pressure, i.e. more reducing atmospheres, the denser the ferrite. Also, lower temperature sintering is characterized by lethargic diffusion rates thereby limiting densification.

From the foregoing, it is apparent that contradictory sintering conditions exist to achieve high porosity manganese-zinc ferrite having good magnetic properties. Consequently, heretofore, the only high quality manganese-zinc ferrites with the requisite magnetic properties have been produced with hot press techniques.

SUMMARY OF THE INVENTION

It is therefore an object of the invention to provide an improved method for fabricating manganese-zinc ferrite.

Another object of the invention is to provide an improved method of fabricating low porosity manganese-zinc ferrite by sintering using conventional high-production facilities.

Another object of the invention is to provide an improved method of making manganese-zinc ferrite suitable for use in magnetic recording transducer heads.

In accordance with the present invention, a multiple stage sintering process is utilized so that contradictory sintering conditions can be imposed at different stages of the fabricating process so that low-porosity, high permeability manganese-zinc ferrite results. Initially, densification must be attained with appropriate temperature and atmosphere to limit dezincification. Then retort atmosphere conditions must be altered during later sintering to achieve proper stoichimetry for maximum magnetic properties. And finally, a more reducing atmosphere is used during cool down to maintain ferrite stoichiometry.

More specifically, the improved manganese-zinc ferrite fabrication process comprises first forming a cold, isostatically pressed ferrite body. The body comprises $Fe_2O_3$, MnO, and ZnO in the desired quantities. Next, this "green" ferrite body is sintered at a temperature of about 1180° to 1230° C in a furnace in a vacuum at about 50 to 200 microns pressure for about three to five hours. Next the ferrite body is sintered at the same temperature for a minimum of 18 hours in a stoichiometric atmosphere comprising 0.2% to 0.4% oxygen by volume, at atmospheric pressure. Desirably, the oxygen is mixed with nitrogen or other inert diluent.

Thereafter, the ferrite body is cooled to a temperature of 880° to 920° C in an atmosphere of 0.2% to 0.4% oxygen in, for example, nitrogen, by volume, at atmospheric pressure.

Next, the ferrite body is soaked in a reducing atmosphere containing oxygen less than 0.02% by volume at a temperature of about 880° C to 920° C for a minimum of 18 hours. Preferably, the remainder of the atmosphere is pure nitrogen. And, finally, the body is cooled to less than 400° C in the same atmosphere, before exposing it to higher or normal oxygen content atmosphere.

DESCRIPTION OF THE PREFERRED EMBODIMENTS

The fabrication of manganese-zinc ferrite in accordance with the present invention begins with the well-known preparation of "green" or cold-pressed ferrite. Typically, this includes steps of formulating the desired constituent mixture and various mixing, filtration/drying, pulverizing, calcining, and isostatically cold molding the mixture, according to conventional methods. See, for example, *Introduction to Ceramics* by W. O. Kingery, John Wiley & Sons, N.Y., 1960, Chapter 3, for a general discussion of the operation of ceramic powders, as well as *Soft Ferrites, Properties and Applications*, Chemical Rubber Co. Press, 1969, particularly Sections 1.3.3 and 1.3.4.

One composition known to have desirable properties has the following stoichiometry:

|  | Mole percent |
| --- | --- |
| $Fe_2O_3$ | 52–53 |
| MnO | 24–25 |
| ZnO | 22–23 |

The following processing steps will be based upon this mixture stoichiometry for purposes of illustration; however, it should be understood that the subject invention should not be limited to this particular stoichiometry but rather, is applicable to other manganese-zinc ferrite chemistries.

Next, the cold-pressed, green ferrite is sintered in a vacuum environment for a limited period of time. Specifically, the green ferrite is heated to a temperature in the range of about 1180° to 1230° C at a vacuum of about 50-200 microns pressure for a period of 4 ± 1 hours. The purpose of this step is to attain densification of the ferrite, i.e. reduced porosity, and this is achieved more successfully in a vacuum rather than a gaseous atmosphere. As set forth above, zinc volatization during ferrite sintering limits the upper sinter temperature atmosphere make-up, and pressure.

At 1200° C a 73% reduction in porosity has resulted from the vacuum sintering step described above, which is significantly better than is found to occur with sintering in a gaseous atmosphere. It has also been found that while reduction in porosity is attained at temperatures exceeding 1200° C–1230° C, the magnetic properties of the ferrite is also reduced. Sintering too long and/or at too high a temperature in a vacuum results in high zinc volatization or evaporization, which is very undesirable. Below about 1180° C the porosity of the ferrite approaches less acceptable values. Also, sintering only in a vacuum does not result in a ferrite having optimum magnetic properties or stoichiometry.

In accordance with the present invention, the remainder of the sintering takes place under controlled atmospheric conditions to provide the desired stoichiometry and magnetic properties. The ferrite body is next heated in a reducing, oxygen-deficient atmosphere. This favors manganese-zinc ferrite formation and $Fe^{+2}$ formation results in high permeability characteristics.

More specifically, the ferrite is kept at the same temperature as during vacuum sintering, i.e. about 1180° C to 1230° C but in an atmosphere having a partial pressure of oxygen in the range of about 0.2% to 0.4%, by volume in an inert gas such as nitrogen, for at least 18 hours, at atmospheric pressures. Other gases, such as $CO_2$, can replace the nitrogen, as long as the oxygen partial pressure remains the same. However, nitrogen has been found to provide the best magnetic properties.

Cooling of the ferrite is done in a multi-stage procedure. The cooling atmosphere should be further reducing since $Fe^{+2}$ to $Fe^{+3}$ reaction is favored at lower temperature. It is desirable to maintain the $Fe^{+2}/Fe^{+3}$ ratio established at sinter temperature at room temperature; therefore, reoxidation should be inhibited. It has been found that no significant differences are evident in cooling from the sinter temperature using either $CO_2$, $N_2$, 0.3–0.4% $O_2/N_2$. Degradation is apparent when a vacuum environment cooldown was attempted.

In accordance with the present invention, it has been found that a significant improvement of the magnetic properties occurs if the ferrite body is first cooled to about 900° C ± 20° C at the same atmosphere of 0.2% to 0.4% partial pressure oxygen by volume, when soaked at this temperature for a minimum of at least 18 hours in an almost pure nitrogen atmosphere with less than 0.02% oxygen content by volume, and thereafter cooled to less than 400° C in this same oxygen-deficient, nitrogen atmosphere before exposing the ferrite to higher oxygen content atmosphere.

It should be understood that due to diffusion kinetics, sintering times at the various multi-stages of this preferred process may be varied shorter or longer depending upon the size of the ferrite body being sintered. Thus, in the foregoing description the ferrite body processed was approximately a one-inch cube. For larger bodies, the amount of time required in each step will have to be increased due to the limits of diffusion kinetics. Also, the specific atmospheres described may be varied as to diluent or source of oxidant so long as the oxygen partial pressures are maintained within limits described at the respective process stages.

At 1200° C the grain size distribution falls within the range of about 8 – 13 microns. This is consistent with results obtained by conventional sintering with nickel-zinc ferrite processing. Thus, a uniform grain structure is achieved with fine grain size microstructure at temperatures and times consistent with low porosity sintering, in accordance with the invention.

Manganese-zinc ferrite made in accordance with the present invention is particularly suitable for digital magnetic transducer head application due to its physical and magnetic properties. Manganese-zinc ferrite having a porosity of less than 0.2% by volume with an average, uniform grain size of 10 microns and magnetic permeability ($\mu$) at 3.2 MHz of about 1100 and a magnetic induction at 10 Oersteds of 3500 Gauss has been fabricated with excellent magnetic properties.

Any conventional vacuum furnace could be utilized in carrying out the steps of the subject invention. Of course, the furnace must have the ability to introduce and exhaust the various gaseous atmospheres specified above.

It will be apparent that many modifications and variations may be effected without departing from the scope of the novel concepts of this disclosure.

What is claimed is:

1. A method of producing a low porosity manganese-zinc ferrite body with high permeability and induction comprising the steps of:
    (a) heating an isostatically-pressed body comprising $Fe_2O_3$, MnO and ZnO within a temperature range of about 1180°–1230° C in a vacuum environment of 50 to 200 microns pressure for a period of time of about 3 to 5 hours:
    (b) heating the body within a temperature range of about 1180°–1230° C for at least 18 hours in an atmosphere having an oxygen partial pressure of about 0.2% to 0.4% oxygen, by volume, at atmospheric pressures;
    (c) cooling the body to a temperature in the range of about 880°–920° C in said oxygen partial pressure atmosphere;
    (d) then soaking the body at a temperature in the range of about 880° to 920° C in an atmosphere having less than 0.02% oxygen, by volume, for at least 18 hours; and
    (e) cooling the body to less than 400° C in an atmosphere of less than 0.02% oxygen.

2. The method of claim 1 wherein the non-oxygen part of the atmosphere in steps (b) through (e) comprises nitrogen.

3. A method of fabricating a manganese-zinc ferrite comprising:
    (a) forming a cold-isostatically pressed ferrite body comprising $Fe_2O_3$, MnO and ZnO;
    (b) sintering the ferrite body in a vacuum furnace to about 1180° to 1230° C at a pressure of about 50 to 200 microns vacuum for about 3 to 5 hours;
    (c) thereafter sintering the ferrite body at about 1180° to 1230° C for a minimum of 18 hours in an atmosphere comprising 0.2% to 0.4% oxygen in nitrogen, by volume, at atmospheric pressure;
    (d) cooling the body to a temperature of about 880° to 920° C in an atmosphere of 0.2% to 0.4% oxygen in nitrogen, by volume, at atmospheric pressure;
    (e) soaking the body at a temperature of about 880° to 920° C for a minimum of 18 hours in an atmosphere comprising almost pure nitrogen with oxygen content less than 0.02% by volume; and
    (f) cooling the body to less than 400° C in almost pure nitrogen with oxygen content less than 0.02% by volume before exposing it to higher oxygen content atmosphere.

* * * * *